United States Patent
Nielsen et al.

(10) Patent No.: US 9,519,909 B2
(45) Date of Patent: Dec. 13, 2016

(54) METHODS AND APPARATUS TO IDENTIFY USERS OF HANDHELD COMPUTING DEVICES

(75) Inventors: Christen Nielsen, Palm Harbor, FL (US); Scott Cooper, Tarpon Springs, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 13/409,796

(22) Filed: Mar. 1, 2012

(65) Prior Publication Data

US 2013/0232142 A1  Sep. 5, 2013

(51) Int. Cl.
G06F 7/00 (2006.01)
G06F 17/30 (2006.01)
G06Q 30/02 (2012.01)
H04H 60/45 (2008.01)

(52) U.S. Cl.
CPC .............. *G06Q 30/02* (2013.01); *H04H 60/45* (2013.01)

(58) Field of Classification Search
CPC .... H04H 60/45; G06Q 30/02; G06Q 30/0272; H04L 9/3218
USPC .......... 707/736, 748, 749, E17.045, 999.006
See application file for complete search history.

(56) References Cited

U.S. PATENT DOCUMENTS

| | | | |
|---|---|---|---|
| 6,400,996 B1 | 6/2002 | Hoffberg et al. | |
| 6,783,459 B2 | 8/2004 | Cumbers | |
| 6,839,072 B2 | 1/2005 | Trajkovic et al. | |
| 6,850,252 B1 | 2/2005 | Hoffberg | |
| 7,236,156 B2 | 6/2007 | Liberty et al. | |
| 7,373,820 B1 | 5/2008 | James | |
| 7,479,949 B2 | 1/2009 | Jobs et al. | |
| 7,505,921 B1 | 3/2009 | Lukas et al. | |
| 7,716,054 B2 | 5/2010 | Harris et al. | |
| 7,733,224 B2 | 6/2010 | Tran | |
| 7,859,521 B2 | 12/2010 | Hotelling et al. | |
| 8,049,756 B2 | 11/2011 | Shuster | |
| 8,432,366 B2 | 4/2013 | Hodges et al. | |
| 2003/0179229 A1 | 9/2003 | Van Erlach et al. | |
| 2004/0203850 A1 | 10/2004 | Oesterling | |
| 2004/0239639 A1 | 12/2004 | Stavely et al. | |
| 2005/0212755 A1* | 9/2005 | Marvit ........................ 345/156 |

(Continued)

FOREIGN PATENT DOCUMENTS

EP  2133777  12/2009
WO  0211123  2/2002

OTHER PUBLICATIONS

Patent Cooperation Treaty, "International Search Report and Written Opinion" issued in connection with International Application No. PCT/US12/67049, Mar. 25, 2013 (8 pages).

(Continued)

*Primary Examiner* — Md I Uddin
(74) *Attorney, Agent, or Firm* — Hanley, Flight & Zimmerman, LLC.

(57) ABSTRACT

Methods and apparatus to identify users of handheld computing devices are disclosed. An example method includes generating, via a logic circuit, a first handling pattern indicative of a manner in which a handheld computing device is moved while the handheld computing device is presenting media; and storing the first handling pattern and corresponding user identification information in a database, handling patterns stored in the database to identify users of the handheld computing device.

27 Claims, 7 Drawing Sheets

(56) References Cited

U.S. PATENT DOCUMENTS

| | | |
|---|---|---|
| 2006/0247915 A1 | 11/2006 | Bradford et al. |
| 2007/0180469 A1 | 8/2007 | Finley et al. |
| 2007/0203850 A1 | 8/2007 | Singh et al. |
| 2007/0271518 A1 | 11/2007 | Tischer et al. |
| 2007/0294705 A1 | 12/2007 | Gopalakrishnan et al. |
| 2008/0086533 A1 | 4/2008 | Neuhauser et al. |
| 2008/0091451 A1 | 4/2008 | Crystal |
| 2008/0091762 A1 | 4/2008 | Neuhauser et al. |
| 2008/0109295 A1 | 5/2008 | McConochie et al. |
| 2008/0249867 A1 | 10/2008 | Angell et al. |
| 2009/0012927 A1 | 1/2009 | Brooks et al. |
| 2009/0083129 A1 | 3/2009 | Pradeep et al. |
| 2009/0085877 A1* | 4/2009 | Chang ............. G06F 3/0488 345/173 |
| 2009/0088204 A1* | 4/2009 | Culbert et al. ............ 455/556.1 |
| 2009/0097689 A1 | 4/2009 | Prest et al. |
| 2009/0099983 A1 | 4/2009 | Drane et al. |
| 2009/0128567 A1 | 5/2009 | Shuster et al. |
| 2009/0193052 A1 | 7/2009 | Fitzgerald et al. |
| 2009/0307633 A1* | 12/2009 | Haughay et al. ............ 715/841 |
| 2009/0320123 A1* | 12/2009 | Yu ..................... G06F 21/316 726/16 |
| 2010/0134655 A1 | 6/2010 | Kuroiwa |
| 2010/0225443 A1 | 9/2010 | Bayram et al. |
| 2010/0249538 A1 | 9/2010 | Pradeep et al. |
| 2010/0265204 A1 | 10/2010 | Tsuda |
| 2010/0279738 A1 | 11/2010 | Kim et al. |
| 2011/0004474 A1 | 1/2011 | Bansal et al. |
| 2011/0066383 A1 | 3/2011 | Jangle et al. |
| 2011/0156867 A1* | 6/2011 | Carrizo et al. ............. 340/5.85 |
| 2011/0181422 A1 | 7/2011 | Tran |
| 2011/0279228 A1 | 11/2011 | Kumar |
| 2012/0033594 A1 | 2/2012 | Kalbag |
| 2012/0081392 A1 | 4/2012 | Arthur |
| 2012/0083668 A1 | 4/2012 | Pradeep et al. |
| 2012/0200391 A1* | 8/2012 | Sugiyama et al. .......... 340/5.82 |
| 2012/0278377 A1 | 11/2012 | Weissman et al. |
| 2012/0284332 A1 | 11/2012 | Pradeep et al. |
| 2012/0306758 A1 | 12/2012 | Marsden et al. |
| 2013/0102283 A1* | 4/2013 | Lau et al. .................... 455/411 |
| 2013/0135218 A1 | 5/2013 | Jain et al. |
| 2013/0205360 A1* | 8/2013 | Novak et al. .................... 726/1 |
| 2013/0222277 A1 | 8/2013 | O'Hara |
| 2013/0232142 A1 | 9/2013 | Nielsen et al. |
| 2014/0244566 A1* | 8/2014 | Hewett et al. .................. 706/52 |

OTHER PUBLICATIONS

United States Patent and Trademark Office, "Non-Final Office Action," issued in connection with U.S. Appl. No. 13/473,361, Mar. 31, 2014 (11 pages).

United States Patent and Trademark Office, "Non-Final Office Action," issued in connection with U.S. Appl. No. 13/307,599, Jul. 30, 2014 (18 pages).

United States Patent and Trademark Office, "Final Office Action," issued in connection with U.S. Appl. No. 13/473,361, Aug. 14, 2014 (17 pages).

United States Patent and Trademark Office, "Office Action" issued in connection with U.S. Appl. No. 13/781,236, Nov. 18, 2014 (8 pages).

United States Patent and Trademark Office, "Non-Final Office Action", issued in connection with U.S. Appl. No. 13/307,599 on Jun. 19, 2015, 40 pages.

United States Patent and Trademark Office, "Final Office Action," issued in connection with U.S. Appl. No. 13/307,599, on May 3, 2016, 41 pages.

United States Patent and Trademark Office, "Non-Final Office Action", issued in connection with U.S. Appl. No. 13/473,361 on Feb. 12, 2015, 23 pages.

United States Patent and Trademark Office, "Final Office Action", issued in connection with U.S. Appl. No. 13/781,236 on May 14, 2015, 10 pages.

United States Patent and Trademark Office, "Final Office Action," issued in connection with U.S. Appl. No. 13/307,599, Feb. 23, 2015, 24 pages.

United States Patent and Trademark Office, "Advisory Action," issued in connection with U.S. Appl. No. 13/473,361, on Nov. 10, 2014, 4 pages.

United States Patent and Trademark Office, "Advisory Action," issued in connection with U.S. Appl. No. 13/781,236, Aug. 4, 2015, 3 pages.

United States Patent and Trademark Office, "Notice of Allowance," issued in connection with U.S. Appl. No. 13/781,236, Sep. 29, 2015, 5 pages.

* cited by examiner

METHODS AND APPARATUS TO IDENTIFY USERS OF HANDHELD COMPUTING DEVICES

FIELD OF THE DISCLOSURE

This disclosure relates generally to audience measurement and, more particularly, to methods and apparatus to identify users of handheld computing devices.

BACKGROUND

Audience measurement of media (e.g., broadcast television and/or radio content or advertisements, stored audio and/or video played back from a memory such as a digital video recorder or a digital video disc, a webpage, audio and/or video presented (e.g., streamed) via the Internet, video games, etc.) often involves collection of media identifying data (e.g., signature(s), fingerprint(s), code(s), tuned channel identification information, time of exposure information, etc.) and people data (e.g., user identifiers, demographic data associated with audience members, etc.). The media identifying data and the people data can be combined to generate, for example, media exposure data indicative of amount(s) and/or type(s) of people that were exposed to specific piece(s) of media.

DETAILED DESCRIPTION

Figure 1:
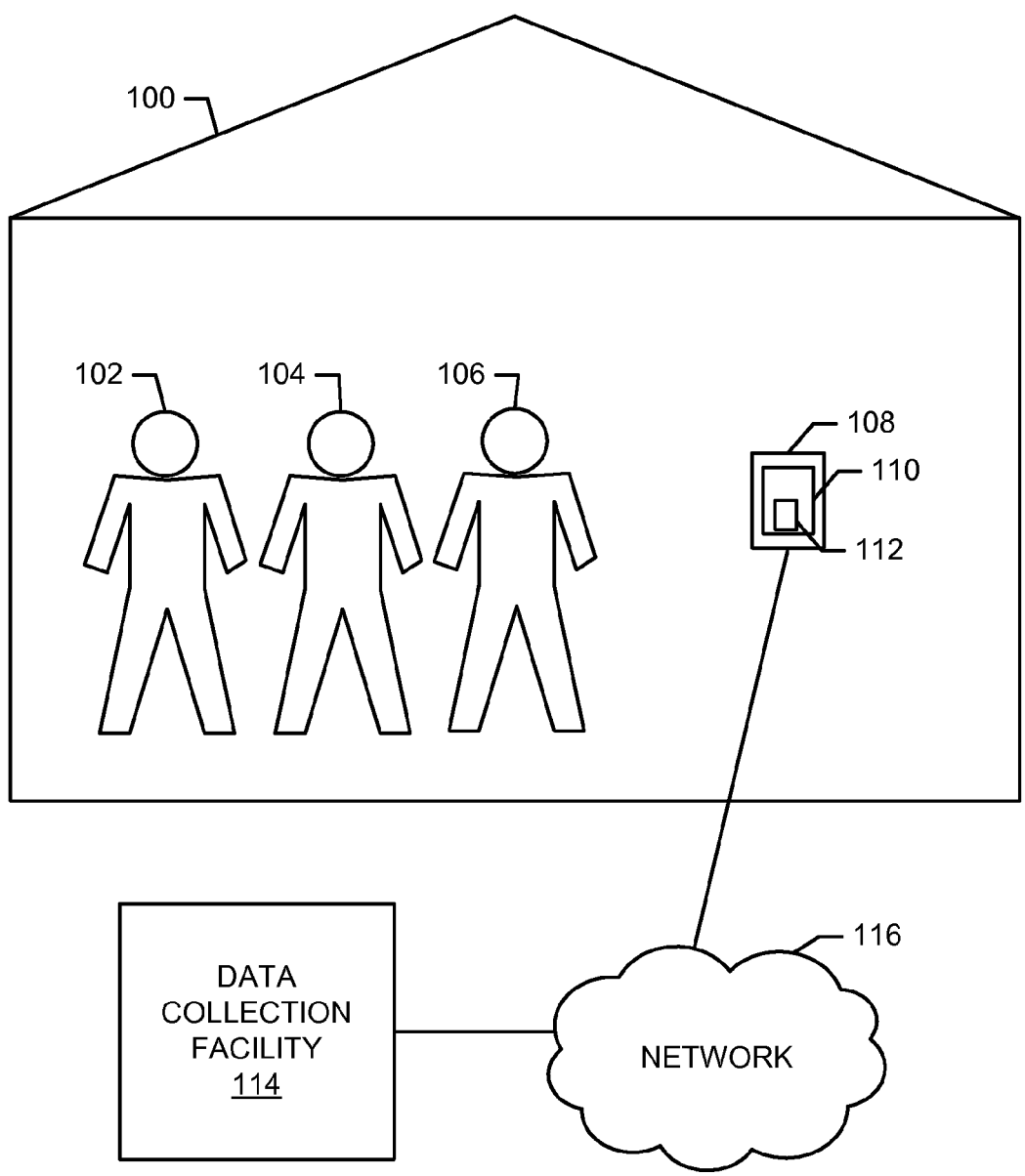
FIG. 1 is an illustration of an example handheld computing device including an example exposure measurement application disclosed herein.

In some audience measurement systems, people data is collected in connection with usage of one or more computing devices. For example, audience measurement systems often employ one or more techniques to determine identities of users browsing the Internet via computing devices, such as personal computers. The people data can be correlated with media accessed by the users to provide exposure data for that media. For example, an audience measurement entity (e.g., Nielsen®) can calculate ratings and/or other statistics for a piece of media (e.g., an advertisement, a website, a movie, a song, an album, a news segment, personal video (e.g., a YouTube® video), a highlight reel, etc.) detected in connection with a computing device at a first time by correlating the piece of media with user identification information detected in connection with the computing device at the first time. Identities of users of computing devices can be used for additional or alternative purposes, such as analyzing online purchasing behaviors, advertisement effectiveness, browsing behaviors, usage behaviors (e.g., duration and/or times of usage), security procedures, etc.

Some computing devices (e.g., desktop computers) require login data (e.g., username and password) to unlock or otherwise grant access to computing operations. When monitoring such machines, login data entered by a current user is often captured by monitoring applications and used to identify that user. The monitoring applications associate user identification information of the login data with media identifying data collected in connection with the computing device during a usage session. A usage session is defined by, for example, a period of time beginning with the entrance of the login data and ending with expiration of the login information (e.g., when the user logs off, when the computing device becomes locked, when the computing device shuts down, etc.). For such machines that require a username and a corresponding password to begin a session, each unique user enters a unique username and, thus, is identifiable as a specific user. This, however, can be frustrated if a second user begins using the computer after a first user has left the machine without logging off.

Some computing devices do not require or are not configured (e.g., in one or more settings) to require login data that is unique to a particular user. For example, instead of accepting a plurality of unique usernames and passwords, some smart phones (e.g., an iPhone®), tablets (e.g., an iPad®), and/or other types of handheld computing devices require a single code (e.g., a four or five digit numerical code such as 1234 or 98765) to unlock a user interface, such as a touch screen. In other words, the code used to access the handheld computing devices does not involve a user name and, thus, will not identify different unique users operating the same device. Thus, when multiple users (e.g., members of a household) use the same handheld computing device, the unlock code does not distinguish among the different users. Instead, when a first user enters the unlock code to use the handheld computing device at a first time and a second user enters the same unlock code to use the handheld computing device at a second time different from the first time, the unlock code does not enable a differentiation between the first and second user. For this and other reasons, identifying a current user of a handheld computing device such as an iPad® or other tablet presents challenges.

Example methods, apparatus, and articles of manufacture disclosed herein provide user identification techniques for handheld computing devices such as, for example, smart phones and/or tablets. As used herein, the term "handheld computing device" is defined to be a computing device that can be simultaneously held in the air and operated by hand(s) of a user. In other words, as used herein, a handheld computing device is readily moved and held by the hand(s) of a user and is designed to receive input from the user while being held (e.g., in the air as opposed to resting on a surface) by the hand(s) of the user. While a handheld computing device can remain stationary during user operation (e.g., can be used resting on a surface), a handheld computing device is not intended to remain stationary during interaction with a user in the same sense as, for example, a desktop computer is intended to remain stationary. For example, a handheld computing device such as a tablet can be placed on a table and operated by a user while resting on the table. However, unlike non-handheld computing devices such as desktop computers, the tablet can also be picked up and operated by the user with one or both hands while the tablet is not fully supported by a table or floor, but instead is held aloft by a user.

To identify users of handheld computing devices, examples disclosed herein detect and analyze handling patterns determined to be unique to particular users. As used herein, a handling pattern is defined to be a set of data indicative of a manner in which a handheld computing device is handled by a user while interacting with the handheld device. As described above, a handheld computing device is one that can be simultaneously held aloft and operated. Thus, as used herein, handling patterns include data indicative of manners in which handheld computing devices are moved, tilted, accelerated, and/or otherwise handled while users interact with the handheld computing devices.

Examples disclosed herein recognize that different users have characteristic (e.g., unique) handling tendencies when interacting with (e.g., consuming) media on handheld computing devices. For example, a first user has a tendency to tap his or her foot in a first rhythm while interacting with a tablet. At the same time, a second user has a tendency to tap his or her foot in a second rhythm different from the first rhythm while interacting with the tablet. In such instances, examples disclosed herein detect the first rhythm (e.g., via gravitational sensors (e.g., accelerometers, gyroscopes, tilt sensors), microphones, global positioning sensors, cameras, etc.) and store that handling pattern in a database such that the first rhythm can be used to identify the first user. Further, examples disclosed herein detect the second rhythm and store that handling pattern in the database such that the second rhythm can be used to identify the second user. Thus, examples disclosed build a database including one or more handling patterns that are each attributable to (e.g., mapped to) a particular user. As described in detail below, to identify users of handheld computing devices, examples disclosed herein detect and utilize additional and/or alternative types of handling patterns such as, for example, an average magnitude of movement of a period of time, a path of descent taken by the computing device when a user sits down, tendencies to alter between portrait and landscape modes at certain frequencies, a screen orientation typically corresponding to a user being in a prone position, a screen orientation typically corresponding to a user being in an upright position, tendencies to walk or otherwise move while interacting with the handheld computing device, a pulse exerted on the handheld computing device by a heartbeat and/or the rate of the pulse, tendencies of a heartbeat pulse to increase and/or decrease in certain pattern(s), a breathing rate causing the handheld computing device to move back and forth, tendencies of a breathing rate to increase and/or decrease in certain pattern(s), tendencies to sneeze and/or cough in certain pattern(s) thereby exerted a movement force on the handheld computing device, etc.

Having built a database reflecting how particular users handle the handheld computing device, examples disclosed herein provide passive user identification for the handheld computing device. As a user interacts with (e.g., consumes) media content via the handheld device, examples disclosed herein detect handling pattern(s) and compare the detected handling pattern(s) to patterns reflected in the database to determine whether the detected handling pattern(s) match (e.g., within a threshold) handling pattern(s) stored in the database. Because the handling patterns stored in the database are known to be attributable or unique to a particular user, if the detected handling pattern matches one of the stored handling patterns, examples disclosed herein determine that the current user likely (e.g., within a confidence level) corresponds to the user identification information stored in the database in connection with the matching handling pattern.

Examples disclosed herein also continue to gather handling pattern data while passively identifying users to add to the database of handling patterns. For example, examples disclosed herein may identify a first user as interacting with a handheld computing device by detecting a first handling pattern associated with the first user in the database. Further, examples disclosed herein may also detect a second handling pattern during the same usage session that does not match any handling patterns of the database. In such instances, examples disclosed herein add the second handling pattern to the database as attributable to or characteristic of the first user, thereby increasing the data available for passively identifying the first user.

FIG. 1 is an illustration of an example household 100 including a plurality of household members 102, 104, and 106. The example household 100 of FIG. 1 (e.g., a "Nielsen family") has been statistically selected by, for example, an audience measurement entity (e.g., The Nielsen Company®) for the purpose of developing statistics (e.g., ratings) for a population/demographic of interest. One or more persons of the household 100 of the illustrated example have registered with the audience measurement entity (e.g., by agreeing to be a panelist) and have provided the demographic information as part of the registration. In the illustrated example of FIG. 1, the provided demographic information includes identification information (e.g., user names, identifiers) for each of the household members 102-106. One or more of the household members 102-106 has access to a handheld computing device 108 having a user interface 110. The example handheld computing device 108 of FIG. 1 is a tablet (e.g., an iPad®). However, the example handheld computing device 108 can be any other type of handheld computing device, such as a smart phone (e.g., an iPhone®).

The example handheld device 108 of FIG. 1 includes an exposure measurement application 112 configured in accordance with teachings of this disclosure. As described in greater detail below in connection with FIGS. 2, 3 and 4A-C, the example exposure measurement application 112 identifies users of the handheld computing device 108 and/or detects media (e.g., an advertisement, a website, a movie, a song, an album, a news segment, personal video (e.g., a YouTube® video), a highlight reel, etc.) to which a user of the handheld computing device 108 is exposed. In the example of FIG. 1, the exposure measurement application 112 communicates user identification information and/or media identification information to a data collection facility 114 via a network 116 (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.). In the illustrated example, the data collection facility 114 is managed by an audience measurement entity that provides the example exposure measurement application 112 to the household 100. For example, the audience measurement entity associated with the data collection facility 114 makes the exposure measurement application 112 available for download onto the example handheld computing 108 over the network 116 and/or via any other suitable network. In some examples, several versions of the exposure measurement application 112 are made available, each version being tailored to a specific operating system and/or type or model of handheld computing device. Additionally, each of the versions of the exposure measurement application 112 may be made available on a download service (e.g., Apple® App Store®) associated with the corresponding operating system and/or type or model of handheld computing device. Any suitable manner of installing the exposure measurement application 112 onto the example handheld computing device 108 may be employed.

Figure 2:
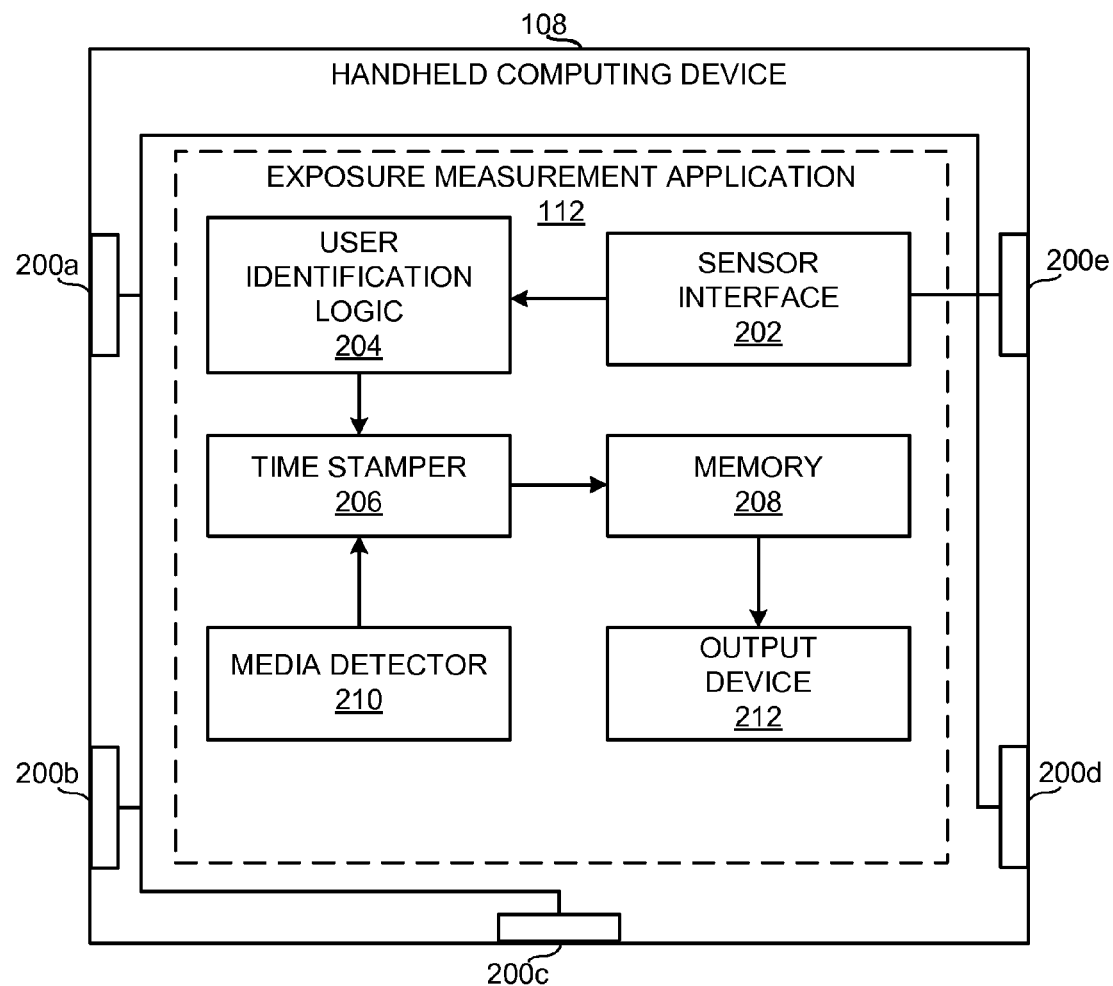
FIG. 2 is a block diagram of an example implementation of the example exposure measurement application of FIG. 1.

FIG. 2 is a block diagram of the example handheld computing device 108 of FIG. 1 including an example implementation of the example exposure measurement application 112 of FIG. 1. The example handheld computing device 108 of FIG. 2 includes a plurality of sensors 200a-e that include one or more gravitational sensors (e.g., accelerometers, gyroscopes, tilt sensors), a microphone, one or more cameras (e.g., a front camera and a rear camera), and global positioning sensors. The sensors 200a-e collect data related to movements, tilts, orientations, paths of movement, etc. of the handheld computing device 108 and/or forces exerted on the handheld computing device 108. For example, one or more of the sensors 200a-e may be a three-dimensional accelerometer capable of generating a chronological series of vectors indicative of directional magnitudes of movements taken by the example handheld computing device 108. Additionally or alternatively, one or more of the sensors 200a-e may be camera capable of generating a chronological series of images that can be interpreted to represent movements taken by the example handheld computing device 108. In the illustrated example of FIG. 2, data collected by the sensors 200a-e is conveyed to a sensor interface 202 of the example exposure measurement application 112. The example sensor interface 202 of FIG. 2 interprets, formats, and/or conditions the data provided by the sensors 200a-e such that data collected by the sensors 200a-e is useable by the exposure measurement application 112. Thus, the example exposure measurement application 1122 of FIG. 2 uses data provided by the sensors 200a-e native to the handheld computing device 108 and, thus, does not require installation or coupling of non-native sensors to the handheld computing device 108. That is, the example exposure measurement application 112 of the illustrated example utilizes existing sensors 200a-e of the handheld computing device 108. In other examples, additional sensors are added to the monitored device.

To identify users of the handheld computing device 108, the example exposure measurement application 112 includes user identification logic 204. The example user identification logic 204 of FIG. 2 receives sensor data from the sensor interface 202 related to movements, tilts, orientations, orientation changes, forces, etc. experienced by the handheld computing device 108 when, for example, the handheld computing device 108 is presenting media content (e.g., while one or more applications of the handheld computing device 108 are outputting media content such as a movie, a song, an advertisement, etc.). The example user identification logic 204 compiles, aggregates, and/or otherwise processes the sensor data into handling patterns, each of which is attributable to a current user. The example user identification logic 204 stores the handling patterns in a database in connection with user identification information identifying the current user, which is initially provided by, for example, the current user in response to a prompt generated by the example user identification logic 204.

After a certain amount of handling patterns have been stored in the database in association with (e.g., mapped to) user identification information, the example user identification logic 204 compares data provided by the sensors 200a-e to the handling patterns of the database to determine if the sensor data matches (e.g., within a threshold) any of the stored handling patterns known to be associated with a user. If a strong enough match (e.g., above a confidence level or percentage) is detected, the example user identification logic 204 of FIG. 2 determines that the user associated with the matching handling pattern of the database corresponds to the current user. Thus, the example user identification logic 204 determines an identity of a current user of the handheld computing device 108 by detecting a manner in which the current user is handling the handheld computing device 108. The example user identification logic 204 is described in greater detail below in connection with FIGS. 3 and 4A-C.

The example user identification logic 204 of FIG. 2 outputs user identification information to a time stamper 206. The time stamper 206 of the illustrated example includes a clock and a calendar. The example time stamper 206 of FIG. 2 associates a time and date with the user identification information provided by the example user identification logic 204 by, for example, appending the time/date data to the end of the corresponding data. A data package including, for example, the user identification information, a timestamp, a type or identifier associated with the handheld computing device 108, registration information associated with the household 100 and/or any of the members 102-106, etc. is stored in a memory 208. While shown as part of the example exposure measurement application 112 in FIG. 2, the memory 208 of the illustrated example is memory of the monitored handheld computing device 108 accessible to the example exposure measurement application 112. The memory 208 may include a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The memory 210 may include one or more double data rate (DDR) memories, such as DDR, DDR2, DDR3, mobile DDR (mDDR), etc. The memory 208 may also include one or more mass storage devices such as, for example, hard drive disk(s), compact disk drive(s), digital versatile disk drive(s), etc.

The example exposure measurement application 112 of FIG. 2 also includes a media detector 210 and an output device 212. The example media detector 210 of FIG. 2 detects presentation(s) of media (e.g., a song, a movie, a website, an advertisement, etc.) on the handheld computing device 108 and collects media identifying information associated with the detected presentation(s). For example, the media detector 210 can identify a presentation time and a source of a presentation. The source identification data may be, for example, a universal resource locator (URL) associated with a web address that hosts a movie, a television program presented via an online service (e.g., Hulu®), a song, etc. The example media detector 210 can obtain the URL by, for example, monitoring a browser of the handheld computing device 108 and/or selection(s) made on the user interface 110 of the handheld computing device 108. Additionally or alternatively, the media detector 210 may utilize codes embedded and/or otherwise associated with media being presented on the handheld computing device 108 to identify the presentation(s). As used herein, a code is an identifier that is transmitted with the media for the purpose of identifying and/or for accessing the corresponding media. Codes may be carried in the audio, in the video, in metadata, in a program guide, or in any other portion of the media and/or the signal carrying the media. Additionally or alternatively, the media detector 210 can collect a signature representative of a portion of the media. As used herein, a signature is a representation of some characteristic of the media (e.g., a frequency spectrum of an audio signal). Signatures may be thought of as fingerprints of the media. Collected signature(s) can be compared against a collection of signatures of known media to identify the corresponding media. In some examples, the media detector 210 collects the signature(s). Additionally or alternatively, the media detector 210 can collect samples of the media and export the samples to a remote site for generation of the signature(s). Irrespective of the manner in which the media of the presentation is identified (e.g., based on browser monitoring, codes, metadata, and/or signatures), the media identification information is time stamped by the time stamper 206 and may be stored in the memory 208.

In some examples, the media detector 210 sends a signal to the user identification logic 204 in response to determining that the handheld computing device 108 is presenting media, thereby triggering the user identification logic 204 to collect handling pattern information. In such instances, the user identification logic 204 collects and interprets data from the sensors 200a-e while the handheld computing device 108 presents media such that the example user identification logic 204 learns tendencies of the current user related to exposure to media. In other words, the example user identification logic 204 of FIG. 2 cooperates with the media detector 210 to determine how particular users interact with the handheld device 108 while being exposed to media (e.g., while watching a movie).

In the illustrated example of FIG. 2, the output device 212 periodically and/or aperiodically exports the recorded data from the memory 208 to the data collection facility 114 of FIG. 1 via the network 116. The data collection facility 114 can analyze the data provided by the example exposure measurement application 112 in any suitable manner to, for example, develop statistics regarding exposure of the identified users and/or users having similar demographic(s) as the identified users. Alternatively, the data analysis could be performed locally and exported via the network 116 or the like to the data collection facility 114 for further processing. For example, user identification information detected in connection with the handheld computing device 108 (e.g., by the user identification logic 204) at a time (e.g., as indicated by the time stamp appended to the user identification information by the time stamper 206) at which an advertisement is detected (e.g., by the media detector 210) as presented on the handheld computing device 108 can be used in a exposure rating calculation for the advertisement.

While an example manner of implementing the exposure measurement application 112 of FIG. 1 has been illustrated in FIG. 2, one or more of the elements, processes and/or devices illustrated in FIG. 2 may be combined, divided, re-arranged, omitted, eliminated and/or implemented in any other way. Further, the example sensor interface 202, the example user identification logic 204, the example time stamper 206, the example content detector 210, the example output device 212, and/or, more generally, the example exposure measurement application 112 of FIG. 2 may be implemented by hardware, software, firmware and/or any combination of hardware, software and/or firmware. Thus, for example, any of the example sensor interface 202, the example user identification logic 204, the example time stamper 206, the example content detector 210, the example output device 212, and/or, more generally, the example exposure measurement application 112 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. At least one of the example sensor interface 202, the example user identification logic 204, the example time stamper 206, the example content detector 210, the example output device 212, and/or, more generally, the example exposure measurement application 112 of FIG. 2 are hereby expressly defined to include a tangible computer readable medium such as a memory, DVD, CD, Blu-ray, etc. storing the software and/or firmware. Further still, the example exposure measurement application 112 of FIG. 2 may include one or more elements, processes and/or devices in addition to, or instead of, those illustrated in FIG. 2, and/or may include more than one of any or all of the illustrated elements, processes and devices.

Figure 3:
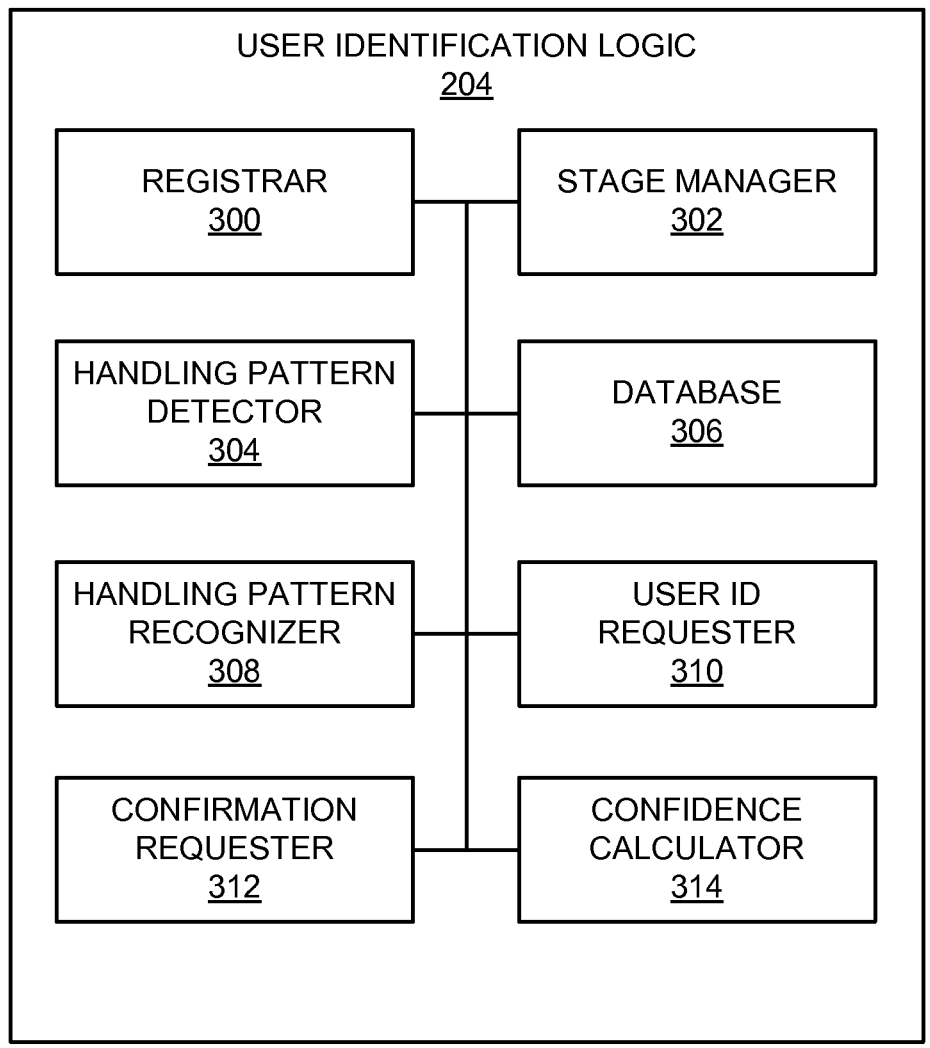
FIG. 3 is a block diagram of an example implementation of the example user identifier of FIG. 2.

FIG. 3 is a block diagram of an example implementation of the example user identification logic 204 of FIG. 2. The example user identification logic 204 includes a registrar 300 to facilitate registration of users of the example handheld computing device 108 of FIG. 1. For example, when the example handheld computing device 108 downloads the example exposure measurement application 112 of FIGS. 1 and/or 2, the registrar 300 requests identification information for each of the household members 102-106 and/or any other expected users of the handheld computing device 108 (e.g., frequent guest(s) of the household 100). In the illustrated example, the registrar 300 reserves an identifier (e.g., a user name, a number or label) for each expected user that provides identification information. With reference to FIG. 1, the first household member 102 may be assigned 'A,' the second household member 104 may be assigned 'B,' and the third household member 106 may be assigned 'C'. Additionally or alternatively, the registrar 300 requests and/or otherwise obtains demographic information for one or more of the expected users and stores the demographic information in connection with the reserved identifier(s).

The example user identification logic 204 of FIG. 3 includes a stage manager 302 to manage a plurality of stages in which the example user identification logic 204 operates. In the illustrated example, the stage manager 302 manages four stages. However, the example user identification logic 204 can include an alternative amount of stages or only one stage. Moreover, the example stages described herein in connection with the example stage manager 302 can overlap. For example, the first stage described below can extend into the second, third and/or fourth stages managed by the example stage manager 302.

The first stage managed by the example stage manager 302 of FIG. 3 is one in which a handling pattern detector 304 collects sensor data from the sensor interface 202, forms a plurality of handling patterns experienced by the handheld computing device 108, and stores the detected handling patterns in a database 306. In the illustrated example, the handling pattern detector 304 is triggered to collect and analyze data from the sensor interface 202 by, for example, the media detector 210 when the media detector 210 determines that the handheld computing device 108 is outputting media. Thus, in the illustrated example, the handling pattern detector 304 detects handling patterns exerted on the handheld computing device 108 by the current user when the handheld computing device 108 is presenting media to that user. As a result, the example handling pattern detector 304 of FIG. 3 develops information related to manners in which users of the handheld computing device 108 handle the same while likely accessing media. In some examples, the example handling pattern detector 304 records a type of media being presented when each of the handling patterns are detected (e.g., as provided by the media detector 210 of FIG. 2). In other words, the example handling pattern detector 304 detects that the current user handles the handheld computing device 108 in a first manner while watching movies, in a second manner different from the first manner while listening to music, in a third manner different from the first and second manners while watching television programming, etc. Additionally or alternatively, the example handling pattern detector 304 can record handling patterns experienced by the handheld computing device 108 during any type of media. Additionally or alternatively, the example handling pattern detector 304 can detect handling patterns when the handheld computing device 108 is performing alternative operations and/or can continuously detect handling patterns regardless of an operating status of the handheld computing device 108.

The example handling pattern detector 304 of FIG. 3 detects movement, tilts, orientation changes, etc. experienced by the handheld computing device 108 that are significant (e.g., abrupt changes and/or movements of large magnitude) and/or repeated in a usage session (e.g., a period of activity and/or a period between the handheld computing device 108 being turned on and off). For example, the handling pattern detector 304 detects a rapid descent of the handheld computing device 108 that likely corresponds to the user sitting down while holding the handheld computing device 108. In such instances, the handling pattern detector 304 detects and records a path of descent taken by the handheld computing device 108. The detected path of descent may be unique to the current user and, thus, available as a handling pattern by which the current user can be identified. In some examples, the handling pattern detector 304 detects a repetitive bouncing, tapping, tilting, swaying, and/or other repeated movement exerted on the handheld computing device 108. Additionally or alternatively, the example handling pattern detector 304 may detect an orientation of the handheld device 108 when the repetitive movement is exerted on the handheld computing device 108. The magnitude, direction, frequency, rhythm and/or any other aspect of the repetitive movement and/or the orientation of the handheld computing device 108 when the repetitive movement is detected may be unique to the current user and, thus, available as a handling pattern by which the current user can be identified. In some examples, the handling pattern detector 304 detects a lack of major movement (e.g., below a magnitude and/or velocity threshold) of the handheld computing device 108 while the device 108 is in a tilted position or orientation during the presentation of media. In doing so, the example handling pattern detector 304 determines that a certain user is prone to holding the handheld computing device 108 still in a certain orientation while, for example, watching a movie. In some examples, the handling pattern detector 304 uses one or more images captured by a camera to detect a movement pattern. Additionally, the camera can be used to attempt to identify the user (e.g., using facial recognition techniques). In some examples, the handling pattern detector 304 detects pattern(s) related to cough(es) and/or sneeze(s) and the corresponding forces exerted on the handheld computing device 108. In some examples, the handling pattern detector 304 detects pattern(s) related to breathing and the repetitive movements of the handheld computing device 108 caused by breathing of the user. The example handling pattern detector 304 of FIG. 3 may also detect additional and/or alternative types of patterns or manners in which the current user handles the handheld computing device 108.

The example stage manager 302 of FIG. 3 operates the user identification logic 204 in the first stage for a period of time (e.g., one or two calendar weeks), a period of usage (e.g., the first one hundred hours of usage of the handheld computing device 108), and/or until a amount of sensor data and/or handling patterns have been collected. These thresholds may vary or may be predetermined Upon completion of the first stage, the example stage manager 302 of FIG. 3 enters the user identification logic 204 into a second stage in which a handling pattern recognizer 308 determines that the handheld computing device 108 is experiencing and/or experienced one or more of the handling patterns stored in the database 306. The second stage implemented by the example stage manager 302 of FIG. 3 also includes a user identifier (ID) requestor 310 requesting user identification information from the current user in response to the handling pattern recognizer 308 determining that that handheld computing device 108 is experiencing and/or experienced one or more of the handling patterns stored in the database 306. In the illustrated example, the handling pattern recognizer 308 compares data received from the sensor interface 202 to the content of the database 306 to determine whether the current movements, tilts, orientations, etc. of the handheld computing device 108 match any of the previously stored handling patterns of the database 306 within a margin of error reflected by a threshold. For example, the handling pattern recognizer 308 may generate a similarity score for each of the stored handling patterns of the database 306 indicative of a degree of similarity to the current sensor data from the sensor interface 202. When the sensor data does not match any of the stored handling patterns, the sensor data is added to in the database as another handling pattern per the first stage described above. On the other hand, when any of the similarity scores are within the margin of error (e.g., threshold), the user ID requestor 310 generates a prompt on the user interface 110 that requests user identification information from the user such that the user identification logic 204 can attribute the detected handling pattern to a particular one of, for example, the household members 102-106. As described above, the expected users of the handheld computing device 108 (e.g., the household members 102-106) are registered on the handheld computing device 108 via the registrar 300. Thus, in the illustrated example, the user ID requestor 310 asks the user to select from a menu including names of the registered expected users. For example, the user ID requestor 310 prompt the user to select a first button adjacent a name, picture, and/or avatar of the first household member 102, a second button adjacent a name, picture and/or avatar of the second household member 104, or a third button adjacent a name, picture, and/or avatar of the third household member 106, etc.

The example stage manager 302 of FIG. 3 operates in the second stage for a period of time (e.g., one or two calendar weeks), a period of usage (e.g., the second one hundred hours of usage of the handheld computing device 108), until user identification information is provided for each handling pattern detected in the first stage, and/or until a percentage (e.g., seventy-five percent) of the handling patterns detected in the first stage. These events may be defined by predetermined thresholds or thresholds that vary. In some examples, the first stage and the detection of handling patterns by the handling pattern detector 304 continues through the second stage.

Upon completion of the second stage, the example stage manager 302 of FIG. 3 enters a third stage in which the user identification logic 204 attempts to identify a current user of the handheld computing device 108 and requests confirmation of the attempt from the current user via a confirmation requester 312. After having received sufficient user identification information for a sufficient amount of handling patterns in the second stages, the example handling pattern recognizer 308 of FIG. 3 selects the stored handling pattern most similar to the manner in which the handheld computing device 108 is currently being handled (e.g., according to the data received via the sensor interface 202). When the selected handling pattern is similar to the current sensor data within a margin of error threshold, the example handling pattern recognizer 308 obtains the corresponding user identification information from the database 306 and conveys the user identification information to the confirmation requester 312. The example confirmation requester 312 presents the obtained user identification information to the current user in a prompt via the user interface 110. The prompt generated by the example confirmation requester 312 asks the user whether the obtained user identification is correct. For example, the prompt generated by the example confirmation requester 312 may include a name, picture, and/or avatar associated with the user identification information obtained by the handling pattern recognizer 308 in conjunction with a yes/no question, such as "Are you this person?" The example confirmation requester 312 receives an input indicative of the correctness or incorrectness of the match detected by the example pattern recognizer 308. When the feedback provided via the confirmation requester 312 verifies the accuracy of the detected match, the example user identification logic 204 stores an indication of the successful user identification in the database 306 to strengthen the association of the corresponding handling pattern with the identified user.

In the illustrated example of FIG. 3, when the confirmation requester 312 receives a verification of the user identification information presented in the prompt, the corresponding user identification information is output by the user identification logic 204 (e.g., to the timestamper 206 of FIG. 2). In contrast, when the confirmation requester 312 receives a denial of the user identification information presented in the prompt, the corresponding user identification information is treated by the user identification logic 204 as inaccurate.

The example stage manager 302 of FIG. 3 operates user identification logic 204 in the third stage for a period of time (e.g., one or two calendar weeks), a period of usage (e.g., the second one hundred hours of usage of the handheld computing device 108), and/or until confirmation of a threshold amount of handling patterns is received for all or a percentage (e.g., a majority) of the registered users. These events may be defined by predetermined thresholds or thresholds that vary.

Upon completion of the third stage, the example stage manager 302 enters a fourth stage in which the example user identification logic of FIG. 3 passively identifies the current user of the handheld computing device 108. During the fourth stage, the example handling pattern recognizer 308 of FIG. 3 selects the stored handling pattern most similar to the manner in which the handheld computing device 108 is currently being handled (e.g., according to the data received via the sensor interface 202). The example handling pattern recognizer 308 conveys the detected handling pattern to a confidence calculator 314. The example confidence calculator 314 of FIG. 3 calculates a similarity score between the detected handling pattern and the sensor data from the sensor interface 202. Further, the example confidence calculator 314 incorporates an amount of verifications associated with the stored handling pattern provided by the confirmation requester 312 to form a confidence value for the handling pattern recognized by the handling pattern recognizer 308. For example, the confidence calculator 314 may multiply the calculated similarity score by a factor that varies depending on the amount of verifications provided by the confirmation requester 312. Thus, while first and second handling patterns may have the same similarity score with respect to the current sensor data, the example confidence calculator 314 may generate different confidence values when the first handling pattern has been verified by the confirmation requester 312 more than the second handling pattern.

In some examples, the confidence calculator 314 also incorporates a type of media currently being presented on the handheld computing device 108 into the confidence value. As described above, the example handling pattern detector 304 records the type of media being presented on the handheld computing device 108 in connection with the detected handling patterns stored in the database 306. For example, a first handling pattern of the database 306 may have been detected while the user was watching a movie. When generating a confidence value for the stored handling pattern (recognized by the handling pattern recognizer 308) with respect to the current sensor data, the example confidence calculator 314 increases the confidence value (e.g., by a percentage that may be predefined) when the type of media associated with the stored handling pattern matches a type of media currently being displayed on the handheld computing device 108. In some examples, such an increase in the confidence value is considered a bonus, in that non-matching handling patterns are not decreased or otherwise penalized.

In the illustrated example of FIG. 3, when the confidence calculator 314 generates a confidence value meeting or exceeding a threshold, the corresponding user identification information is output by the user identification logic 204 (e.g., to the timestamper 206 of FIG. 2). In contrast, when the confidence calculator 314 generates a confidence value below the threshold, the corresponding user identification information is treated by the user identification logic 204 as insufficiently reliable. Alternatively, when the confidence value is below the threshold, the example confirmation requester 312 can be triggered to confirm the user identification information and, if confirmed, the user identification information can be output by the user identification logic 204.

The example stage manager 302 of FIG. 3 operates in the fourth stage until, for example, a new user is registered via the registrar 300 and/or until a return to an earlier stage is triggered (e.g., by one of the household members 102-106 and/or an administrator associated with an audience measurement entity associated with the example exposure measurement application 112 of FIGS. 1 and/or 2).

While an example manner of implementing the user identification logic 204 of FIG. 2 has been illustrated in FIG. 3, one or more of the elements, processes and/or devices illustrated in FIG. 3 may be combined, divided, re-arranged, omitted, eliminated and/or implemented in any other way. Further, the example registrar 300, the example stage manager 302, the example handling pattern detector 304, the example handling pattern recognizer 308, the example user ID requester 310, the example confirmation requester 312, the example confidence calculator 314, and/or, more generally, the example user identification logic 204 of FIG. 3 may be implemented by hardware, software, firmware and/or any combination of hardware, software and/or firmware. Thus, for example, any of the example registrar 300, the example stage manager 302, the example handling pattern detector 304, the example handling pattern recognizer 308, the example user ID requester 310, the example confirmation requester 312, the example confidence calculator 314, and/or, more generally, the example user identification logic 204 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), field programmable gate array (FPGA), etc. At least one of the example registrar 300, the example stage manager 302, the example handling pattern detector 304, the example handling pattern recognizer 308, the example user ID requester 310, the example confirmation requester 312, the example confidence calculator 314, and/or, more generally, the example user identification logic 204 of FIG. 3 are hereby expressly defined to include a tangible computer readable medium such as a memory, DVD, CD, Bluray, etc. storing the software and/or firmware. Further still, the example user identification logic 204 of FIG. 3 may include one or more elements, processes and/or devices in addition to, or instead of, those illustrated in FIG. 3, and/or may include more than one of any or all of the illustrated elements, processes and devices.

Figure 4A:
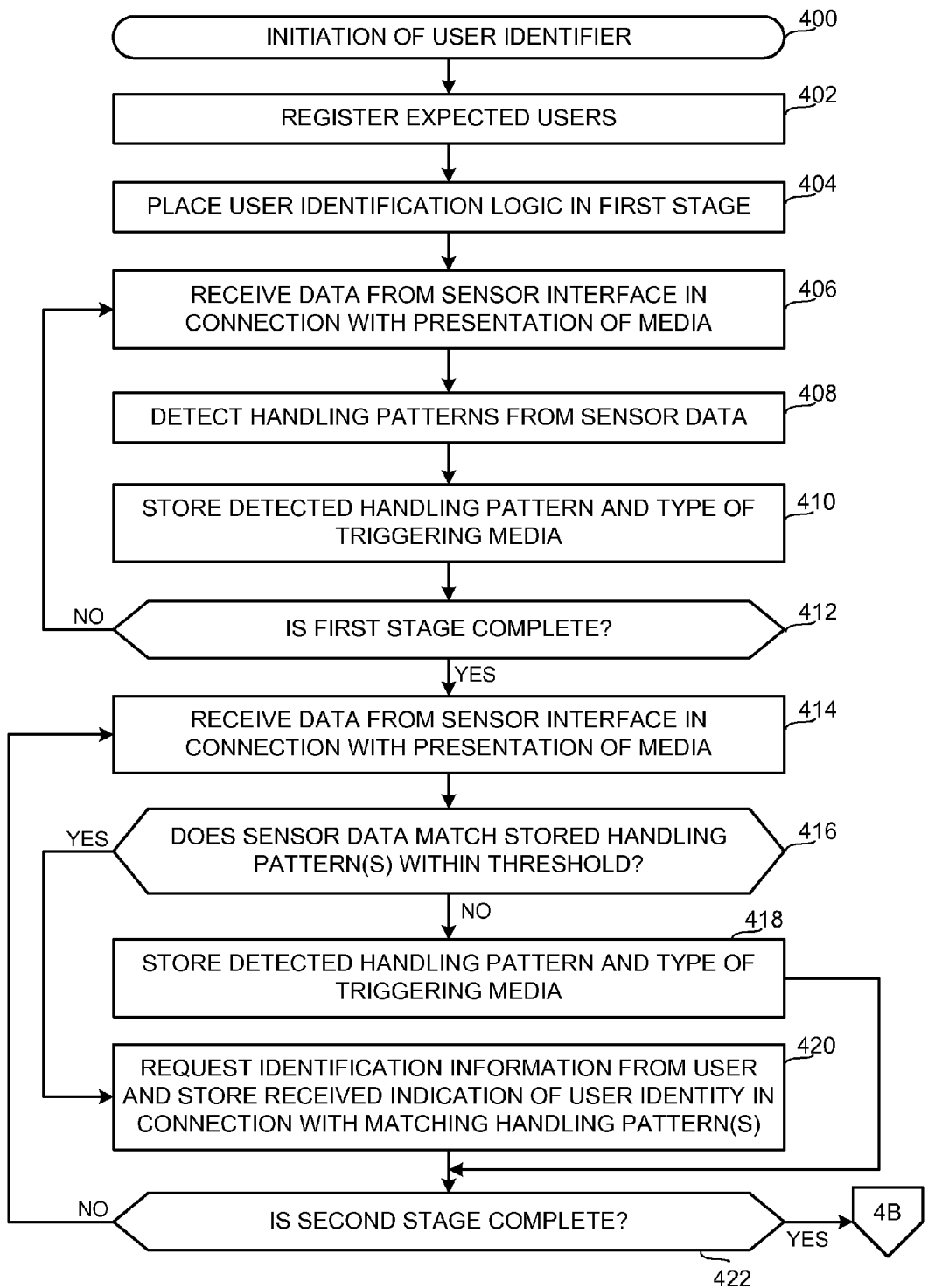
FIGS. 4A-C are flowcharts representative of example machine readable instructions that may be executed to implement the example user identifier of FIGS. 2 and/or 3.
Figure 4B:
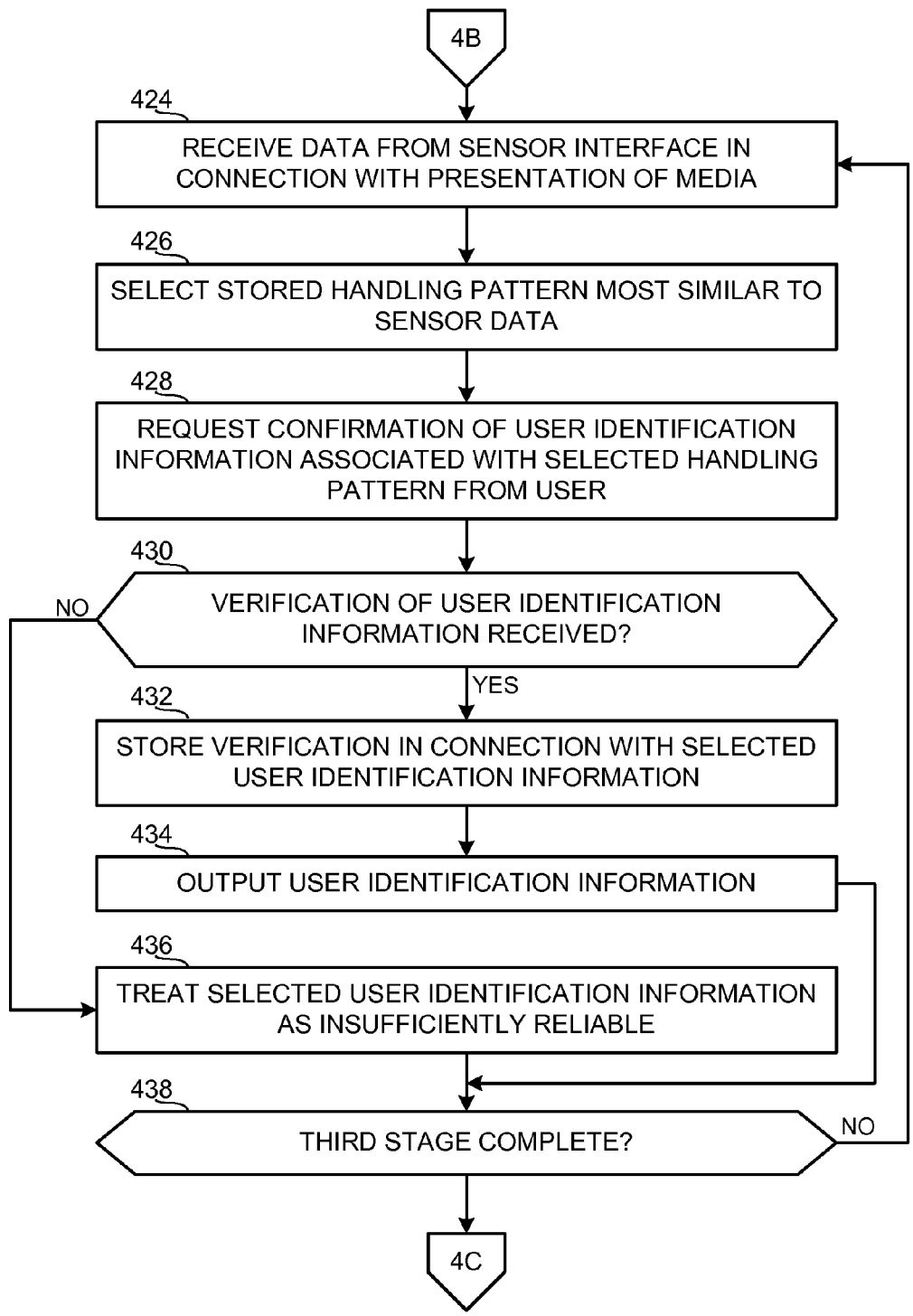
Figure 4C:
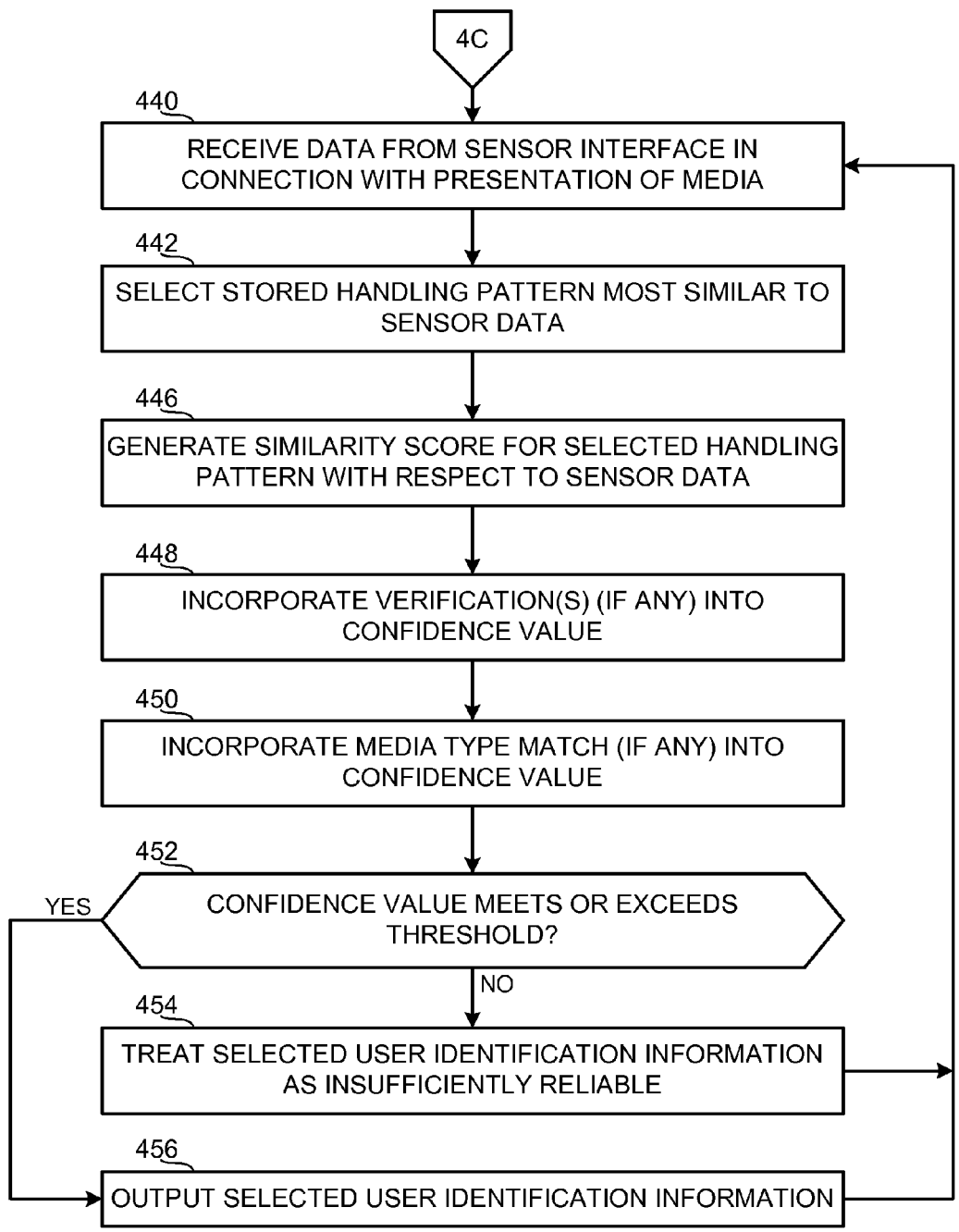

Flowcharts representative of example machine readable instructions for implementing the example user identification logic 204 of FIGS. 2 and/or 3 are shown in FIGS. 4A-C. In these examples, the machine readable instructions comprise a program for execution by a processor such as the processor 512 shown in the example computer 500 discussed below in connection with FIG. 5. The program may be embodied in software stored on a tangible computer readable medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example programs are described with reference to the flowcharts illustrated in FIGS. 4A-C, many other methods of implementing the example user identification logic 204 may alternatively be used. For example, the order of execution of the blocks may be changed, and/or some of the blocks described may be changed, eliminated, or combined.

As mentioned above, the example processes of FIGS. 4A-C may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage and to exclude propagating signals. Additionally or alternatively, the example processes of FIGS. 4A-C may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 4A begins with an initiation of the example user identification logic 204 of FIGS. 2 and/or 3 (block 400). In the example of FIG. 4A, the user identification logic 204 is initiated when the example exposure measurement application 112 of FIGS. 1 and/or 2 is downloaded and/or installed on the handheld computing device 108 of FIGS. 1 and/or 2. For example, the first member 102 of the household 100 of FIG. 1 may download the exposure measurement application 112 via an online application service (e.g., iTunes®) as an application designed for tablets and/or smart phones. When exposure measurement application 112 is opened for the first time on the handheld computing device 108, the registrar 300 of FIG. 3 asks for registration information from the current user (block 402). For example, the registrar 300 may ask for a number of expected users, names of the expected users, pictures of the expected users, and/or demographic information associated with the expected users. The example registrar 300 stores the received information in the database 306.

In the example of FIG. 4A, the example stage manager 300 places the user identification logic 204 in the first stage after the registrar 300 has registered the expected users (block 404). As described above, the first stage of the example user identification logic 204 of FIG. 3 involves developing a library of detected handling patterns indicative of different manners in which the handheld computing device 108 is handled (e.g., moved, tilted, oriented, etc.). In the illustrated example, the library handling patterns are developed in connection with sensor data that is received in connection with a presentation of media on the handheld computing device 108 (block 406). Thus, when the example content detector 210 of FIG. 2 informs the handling pattern detector 304 that media is currently being presented on the handheld computing device 108, the example handling pattern detector 304 uses the data received from the sensor interface 202 to develop handling patterns (block 408). When the example handling pattern detector 304 detects a handling pattern (e.g., a repetitive and/or significant movement, tilt, orientation change, etc.), the example handling pattern detector 304 stores the detected pattern in the database 306 (block 410). In the illustrated example, the handling pattern detector 304 also stores an indication of the type of media (e.g., movie, music, television programming, website, etc.) that triggered the utilization of the sensor data to develop handling patterns in the database 306 in connection with the corresponding handling pattern.

In the example of FIG. 4A, if the stage manager 302 indicates that the user identification logic 204 is still in the first stage (block 412), control returns to block 406. Otherwise, if the stage manager 302 indicates that the first stage is complete (block 412), the stage manager 302 places the user identification logic 204 into the second stage. As described above, the second stage involves obtaining user identification information from a current user to attribute each of the handling patterns developed in the first stage to a particular one of the expected users (e.g., the household members 102-106). When the example content detector 210 of FIG. 2 informs the handling pattern recognizer 308 that media is currently being presented on the handheld computing device 108, the example handling pattern recognizer 308 is triggered to utilize the sensor data received from the sensor interface 202 (block 414). In the illustrated example, the handling pattern recognizer 308 uses the sensor data to determine whether any of the current sensor data corresponds or matches any of the handling patterns stored in the database 306 (e.g., during the first stage) (block 416). If not, the sensor data is passed to the handling pattern detector 304 to develop a new handling pattern that is stored in the database 306 (block 418). On the hand, if the current sensor data matches any of the stored handling patterns of the database 306 (e.g., within a threshold) (block 416), the example user ID requestor 310 generates a prompt on the user interface 110 that requests user identification information from the user such that the user identification logic 204 can attribute the detected handling pattern to a particular one of, for example, the household members 102-106 (block 420). The user identification information received from the user is stored in connection with the matching handling pattern(s) (block 420).

In the example of FIG. 4A, if the stage manager 302 indicates that the user identification logic 204 is still in the second stage (block 422), control returns to block 416. Otherwise, if the stage manager 302 indicates that the second stage is complete (block 422), the stage manager 302 places the user identification logic 204 into the third stage. The example third stage is described in connection with FIG. 4B. As described above, the third stage involves attempting to identify a current user by matching current sensor data to handling patterns of the database 306 and requesting the user for confirmation of the attempt. In the example of FIG. 4B, when the example content detector 210 of FIG. 2 informs the handling pattern recognizer 308 that media is currently being presented on the handheld computing device 108, the example handling pattern recognizer 308 is triggered to utilize the sensor data received from the sensor interface 202 (block 424). In the illustrated example, the handling pattern recognizer 308 uses the sensor data to select the handling pattern of the database 306 most similar to the manner in which the handheld computing device 108 is current being handled (block 426). The selection by the example handling pattern recognizer 308 of FIG. 3 involves generates similarity scores for each or a portion (e.g., the handling patterns detected in connection with the type of media currently being presented on the handheld computing device 108) of the handling patterns of the database 306. The example confirmation requester 312 requests confirmation of the user identification information associated with the selected one of the handling patterns of the database 306 (block 428). If the selected user identification information is verified as accurate by the current user (block 430), the example confirmation requester 312 stores a verification indication in the database 306 in connection with the selected handling pattern (block 432). As described above, the verification indications increase the confidence of the user identification logic 204 that the corresponding handling pattern is characteristic (e.g., unique) of the particular user. Further, the user identification logic 204 outputs the verified user identification information to, for example, the time stamper 206 of FIG. 2 (block 434). Referring to block 430, if the selected user identification information is not verified as accurate and/or is indicated as inaccurate by the current user, the example user identification logic 204 of FIG. 3 treats the selected user identification information as insufficiently reliable (e.g., by not outputting the selected user identification information (block 436).

In the example of FIG. 4B, if the stage manager 302 indicates that the user identification logic 204 is still in the third stage (block 438), control returns to block 424. Otherwise, if the stage manager 302 indicates that the third stage is complete (block 438), the stage manager 302 places the user identification logic 204 into the fourth stage. The example fourth stage is described in connection with FIG. 4C. As described above, the fourth stage involves passively identifying users by utilizing the detected handling patterns and the information stored in connection therewith during the previous three stages. In the example of FIG. 4B, when the example content detector 210 of FIG. 2 informs the handling pattern recognizer 308 that media is currently being presented on the handheld computing device 108, the example handling pattern recognizer 308 is triggered to utilize the sensor data received from the sensor interface 202 (block 440). In the illustrated example, the handling pattern recognizer 308 uses the sensor data to select the handling pattern of the database 306 most similar to the manner in which the handheld computing device 108 is current being handled (block 442). The selection by the example handling pattern recognizer 308 of FIG. 3 involves generates similarity scores for each or a portion (e.g., the handling patterns detected in connection with the type of media currently being presented on the handheld computing device 108) of the handling patterns of the database 306 (block 446). In the illustrated example, the similar score of the selected handling pattern forms a basis for a confidence value to be calculated by the example confidence calculator 314 of FIG. 3. The example confidence calculator 314 incorporates any verification indications stored in connection with the selected handling pattern into the confidence value (block 448). As described above, if the correspondence of a particular handling pattern of the database has been verified as attributable to (e.g., mapped) the corresponding user identification information (e.g., in the third stage), the confidence value increases (e.g., by a fixed percentage or by a percentage depending on the amount of verification indications are present). Further, the example confidence calculator 314 incorporates a match of media type (if any) into the confidence value. As described above, the selected handling pattern is stored in connection with a media type corresponding to the media presentation that triggered the development of the handling pattern during, for example, the first stage. Thus, the if the type of media currently being presented on the handheld computing device 108 in connection with the received sensor data matches the type of media stored in connection with the selected handling patter, the example confidence calculator 314 increases the confidence value (e.g., by a fixed percentage or a percentage depending on the degree of similarity between the stored media type and the currently presented media type). When the confidence value calculated for the selected handling pattern is less than the threshold (e.g., outside a margin of error) (block 452), the sampler user identification logic 204 treats the corresponding user identification information as insufficiently reliable (e.g., by not outputting the user identification information) (block 454). On the other hand, when the confidence value calculated for the selected handling pattern meets or exceeds the threshold (e.g., is within a margin of error) (block 452), the example user identification logic 204 outputs the user identification information associated with the selected handling (e.g., to the timestamper 206) (block 456). That is, the selected user identification information is treated by the user identification logic 204 as an indication of the identity of the current user to which the triggering media is being presented. Control returns to block 440.

Figure 5:
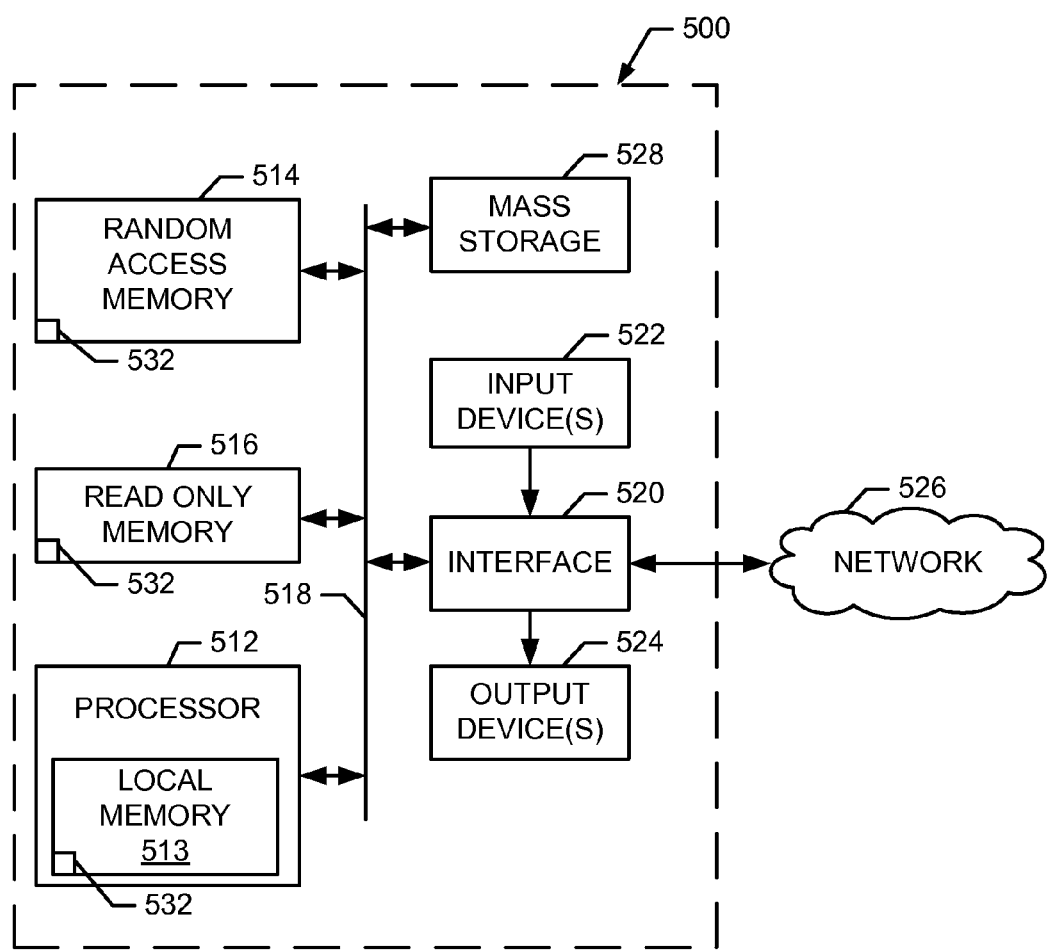
FIG. 5 is a block diagram of an example processing system capable of executing the example machine readable instructions of FIGS. 4A-C to implement the example user identifier of FIGS. 2 and/or 3.

FIG. 5 is a block diagram of an example computer 500 capable of executing the instructions of FIGS. 4A-C to implement the user identification logic 204 of FIGS. 2 and/or 3. The computer 500 can be, for example, a mobile phone (e.g., a cell phone), a personal digital assistant (PDA), a tablet, a laptop computer, a handheld gaming device, or any other type of handheld computing device.

The system 500 of the instant example includes a processor 512. For example, the processor 512 can be implemented by one or more microprocessors or controllers from any desired family or manufacturer.

The processor 512 is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The computer 500 also includes an interface circuit 520. The interface circuit 520 may be implemented by any type of interface standard, such as an Ethernet interface, a universal serial bus (USB), and/or a PCI express interface.

One or more input devices 522 can be connected to the interface circuit 520. The input device(s) 522 permit a user to enter data and commands into the processor 512. The input device(s) can be implemented by, for example, a keyboard, a mouse, a touchscreen, a track-pad, a trackball, isopoint and/or a voice recognition system.

One or more output devices 524 can be connected to the interface circuit 520. The output devices 524 can be implemented, for example, by display devices (e.g., a liquid crystal display, a cathode ray tube display (CRT), a printer and/or speakers). The interface circuit 520, thus, typically includes a graphics driver card.

The interface circuit 520 also includes a communication device such as an antenna, a modem or network interface card to facilitate exchange of data with external computers via a network 526 (e.g., a WiFi network, an Ethernet connection, a digital subscriber line (DSL), a telephone line, coaxial cable, a cellular system, etc.).

The computer 500 also includes one or more mass storage devices 528, such as a hard drive for storing software and data. The mass storage device 528 may implement the memory 208 of FIG. 2.

The coded instructions of FIGS. 4A-C may be stored in the mass storage device 528, in the volatile memory 514, and/or in the non-volatile memory 516.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A method comprising:
    generating, at a first time, via a logic circuit, a first handling pattern indicative of a manner in which a handheld computing device is moved while presenting media;
    in response to the generating, storing, via the logic circuit, the first handling pattern and corresponding user identification information in a database for subsequent analysis to identify a user of the handheld computing device;
    detecting a second handling pattern from data collected by a sensor that detects interaction with the handheld computing device by the user, the second handling pattern being detected at a second time later than the first time;
    generating a similarity score between the first handling pattern generated at the first time and the second handling pattern detected at the second time;
    generating a confidence value that the second handling pattern is the first handling pattern based on the similarity score;
    in response to the confidence value satisfying a threshold, identifying, via the logic circuit, the user based on the first handling pattern matching the second handling pattern and requesting the user to enter the user identification information; and
    in response to detecting that the user identification information entered by the user matches the user identification information stored with the first handling pattern, storing, via the logic circuit, a verification indication in connection with the second handling pattern.

2. The method of claim 1, further including storing a type of media in connection with the second handling pattern, the type of media corresponding to the media that triggered the generation of the second handling pattern.

3. The method of claim 1, wherein the detecting of the second handling pattern at the second time further includes interpreting sensor data collected by sensors native to the handheld computing device at the second time, the sensors including the sensor.

4. The method of claim 3, wherein the requesting of the user identification information is performed in response to interpreting the sensor data as representative of the second handling pattern.

5. The method of claim 1, wherein the requesting of the user to enter the user identification information is implemented by a prompt requesting the user to verify the user identification information.

6. The method of claim 1, further including, when the confidence value meets or exceeds a threshold, associating the user identification information with media presented on the handheld computing device at the second time.

7. The method of claim 1, wherein the generating of the first handling pattern is in response to detecting the media presentation on the handheld computing device.

8. A method comprising:
    generating, at a first time, via a logic circuit, a first handling pattern indicative of a manner in which a handheld computing device is moved during media presentation;
    in response to the generating, storing the first handling pattern and corresponding user identification information in a database for subsequent analysis to identify a user of the handheld computing device;
    detecting a second handling pattern, at a second time later than the first time, from data collected by a sensor that detects interaction with the handheld computing device by the user;
    generating a similarity score between the first handling pattern generated at the first time and the second handling pattern detected at the second time;
    generating a confidence value for the first handling pattern based on the similarity score;
    incorporating a media type match into the confidence value, the media type match corresponding to a similarity between a first type of media corresponding to a first piece of media that triggered the generation of the first handling pattern and a second type of media corresponding to a second piece of media that is presented at the second time after the first time; and verifying that the second handling pattern is attributable to the user identification information stored in connection with the first handling pattern by requesting the user identification information from the user.

9. A tangible computer readable storage medium comprising instructions that, when executed, cause a handheld computing device to at least:

generate, at a first time, a first handling pattern indicative of a manner in which a handheld computing device is moved during media presentation on the handheld computing device;

in response to the generating, store the first handling pattern and corresponding user identification information in a database to identify a user of the handheld computing device during future handling of the handheld computing device;

detect a second handling pattern from data collected by a sensor that detects interaction with the handheld computing device by the user, the second handling pattern being detected at a second time later than the first time;

generate a similarity score between the first handling pattern generated at the first time and the second handling pattern detected at the second time;

generate a confidence value for the second handling pattern for the second time being associated with the user based on the similarity score;

in response the confidence value satisfying a threshold, identify the user based on the second handling pattern matching the first handling pattern and request the user to self-identify to verify that the second handling pattern detected at the second time is of the user associated with the corresponding user identification information; and in response to detecting that the user matches the user identification information stored with the first handling pattern, store a verification indication in connection with the second handling pattern.

10. The computer readable medium of claim 9, wherein the instructions, when executed, cause the handheld computing device to store a type of media in connection with the first handling pattern, the type of media corresponding to the media presentation that triggered the generation of the first handling pattern.

11. The computer readable medium of claim 9, wherein the instructions, when executed, cause the handheld computing device to detect the second handling pattern at the second time by interpreting sensor data collected by sensors native to the handheld computing device at the second time later, the sensors including the sensor.

12. The computer readable medium of claim 11, wherein the instructions, when executed, cause the handheld computing device to interpret the sensor data as representative of the first handling pattern.

13. The computer readable medium of claim 9, wherein the user is requested to self-identify via a prompt.

14. The computer readable medium of claim 9, wherein the instructions, when executed, cause the handheld computing device to, when the confidence value meets or exceeds a threshold, associate the user identification information with media presented on the handheld computing device at the second time.

15. The computer readable medium of claim 9, wherein the generating of the first handling pattern is in response to detecting the media presentation on the handheld computing device.

16. A tangible computer readable storage medium comprising instructions that, when executed, cause a handheld computing device to at least:

generate, at a first time, a first handling pattern indicative of a manner in which a handheld computing device is moved while presenting media on the handheld computing device;

in response to the generating, store the first handling pattern and corresponding user identification information in a database to identify a user of the handheld computing device during future handling of the handheld computing device;

detect a second handling pattern, at a second time later than the first time, from data collected by a sensor that detects interaction with the handheld computing device by the user;

generate a similarity score between the first handling pattern generated at the first time and the second handling pattern detected at the second time later than the first time;

generate a confidence value for the second handling pattern based on the similarity score;

incorporate a media type match into the confidence value, the media type match corresponding to a similarity between a first type of media corresponding to a first piece of media that triggered the generation of the first handling pattern and a second type of media corresponding to a second piece of media that is presented at the second time after the first time; and verify that the second handling pattern is attributable to the user identification information stored in connection with the first handling pattern by requesting the user identification information from the user.

17. A handheld computing device comprising:

a memory containing machine readable instructions;

a processor to execute the machine readable instructions to:

collect, at a first time, a first handling pattern indicative of a manner in which a handheld computing device is moved while the handheld computing device is presenting media, detect a second handling pattern from data collected by a sensor that detects interaction with the handheld computing device by a user, the second handling pattern being detected at a second time later than the first time, generate a similarity score between the first handling pattern generated at the first time and the second handling pattern detected at the second time, generate a confidence value that the second handling pattern is the first handling pattern based on the similarity score, and in response to the confidence value satisfying a threshold, identify the user based on the first handling pattern matching the second handling pattern and request the user to self-identify; and a database to:

store the first handling pattern and corresponding user identification information to subsequently identify the user of the handheld computing device, and in response to detecting that user identification information received from the user in response to the request to self-identify matches the user identification information stored with at least one of the first handling pattern or the second handling pattern, store a verification indication in connection with the first handling pattern.

18. The handheld computing device of claim 17, wherein the processor is to collect the first handling pattern by interpreting a signal associated with an accelerometer of the handheld computing device while the handheld computing device is outputting the media.

19. The handheld computing device of claim 17, wherein the processor is to collect the first handling pattern by interpreting a signal associated with a tilt sensor of the handheld computing device while the handheld computing device is outputting the media.

20. The handheld computing device of claim 17, wherein the processor is to collect the first handling pattern by determining a path of movement of the handheld computing device while the handheld computing device is outputting the media.

21. The handheld computing device of claim 17, wherein the processor is to collect the first handling pattern by determining a rhythm of movements of the handheld computing device while the handheld computing device is outputting the media.

22. The handheld computing device of claim 17, wherein the database is to store a type of the media in connection with the first handling pattern.

23. The handheld computing device of claim 17, further including a recognizer to interpret sensor data collected by sensors native to the handheld computing device at the second time later than the first time as corresponding to the first handling pattern, the sensors including the sensor.

24. The handheld computing device of claim 23, further including a requester to, in response to the recognizer interpreting the sensor data as corresponding to the first handling pattern, initiate a prompt for display on the handheld computing device to confirm the user is associated with the user identification information stored in association with the first handling pattern.

25. The handheld computing device of claim 17, wherein the processor is to associate, when the confidence value meets or exceeds a threshold, the user identification information with media presented on the handheld computing device at the second time.

26. The handheld computing device of claim 17, wherein the processor is to incorporate a media type match into the confidence value, the media type match corresponding to a similarity between a first type of media corresponding to a first piece of media that triggered the collection of the first handling pattern and a second type of media corresponding to a second piece of media presented at the second time.

27. The handheld computing device of claim 17, wherein the processor is to verify the first handling pattern is attributable to the user identification information stored in connection with the first handling pattern by requesting the user identification information from the user.

\* \* \* \* \*